April 12, 1960   J. T. BEESTON, JR   2,932,147
ROTARY MOWER BLADE
Filed June 24, 1957
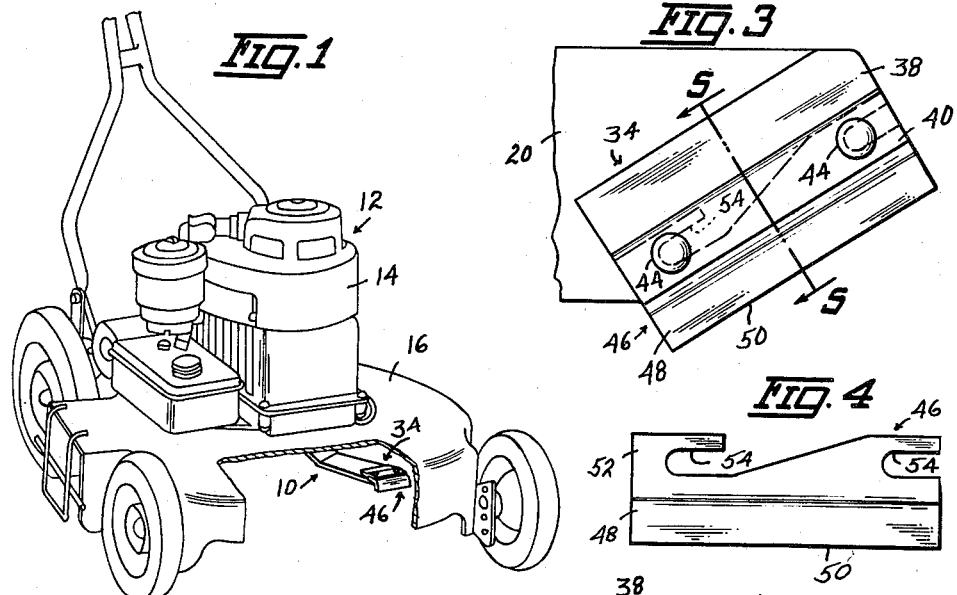
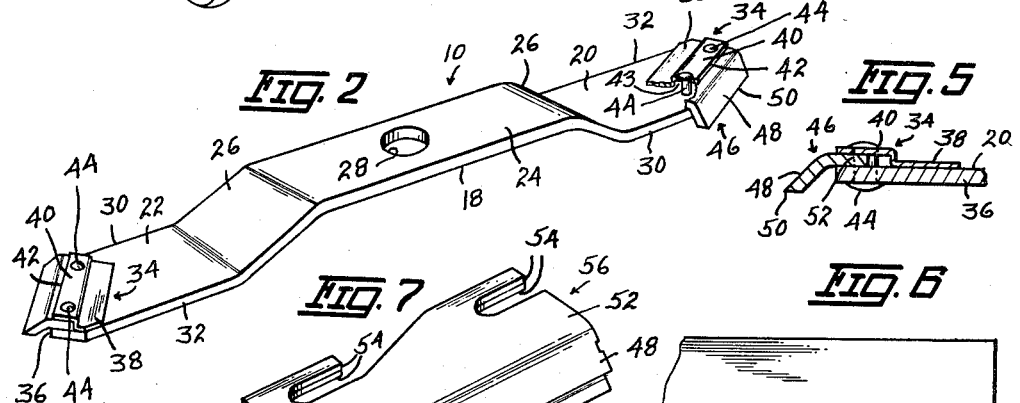
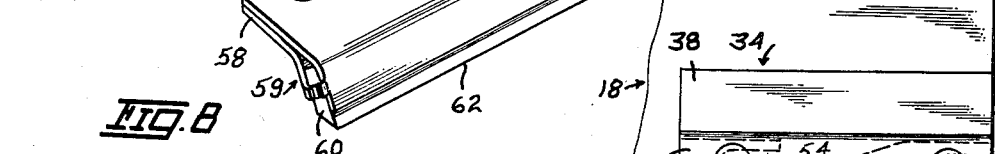
INVENTOR.
JOHN T. BEESTON, JR.
BY *Morton S. Adler*
ATTORNEY.

United States Patent Office 2,932,147
Patented Apr. 12, 1960

2,932,147

ROTARY MOWER BLADE

John T. Beeston, Jr., Des Moines, Iowa, assignor to Frontier Development Company, Des Moines, Iowa, a corporation of Iowa Application June 24, 1957, Serial No. 667,477

12 Claims. (Cl. 56—295)

My invention relates to power driven cutting blades designed preferably for use on rotary type lawn mowers.

One of the important objects of this invention is to provide an expendable throw-away cutting blade for a rotary lawn mower or the like including novel means for attaching it to and releasing it from a rotatable blade holder.

Further objects contemplated herein are the provision of a cutting blade of the above class that can be mounted on and removed from the holder therefor without any tools; that will be held in position against displacement during operation by centrifugal force, and will not become dislodged from its holder during non operation unless manually removed.

Another object inhering herein is to provide a throwaway type cutting blade for a power driven cutting machine such as a rotary lawn mower that is economical to manufacture and yet durable in construction to perform its function in an efficient manner for a relatively long period of time.

Other objects and advantages of this invention reside in the details of construction and correlation of the various parts and will be apparent as the description proceeds.

This invention consists of novel parts and combination of parts to be hereinafter described whereby the objects set forth are attained, as pointed out in the claims, and illustrated in the accompanying drawings in which:

Fig. 1 is a perspective view of a rotary type lawn mower with a portion cut away to show the mounting of my new blade, Fig. 2 is an enlarged perspective view of a blade holder showing a preferred embodiment of my new blade thereon with a portion cut away to more fully illustrate the construction thereof.

Fig. 3 is an enlarged fragmentary plan view of one end of the blade holder showing in full my blade in place thereon, Fig. 4 is an enlarged plan view of my cutting blade, Fig. 5 is a cross sectional view taken on the line 5—5 of Fig. 3, Fig. 6 is a plan view similar to Fig. 3 but showing the blade mounted in a different position relative to the blade holder, Fig. 7 is an enlarged perspective view of my blade showing a modified cutting edge, Fig. 8 is a fragmentary plan view of one end of the blade holder showing a modified cutting blade holding means, and, Fig. 9 is a cross sectional view taken on the line 9—9 of Fig. 8.

Referring to the drawings my new blade assembly is indicated generally by the numeral 10 in Fig. 2 and its operating position on a rotary type lawn mower 12 is shown in Fig. 1. It will be understood that a vertically disposed shaft (not shown) extends from the motor 14 below platform 16 in a well known manner and it is to such shaft that blade assembly 10 is attached.

Blade assembly 10 comprises an elongated rigid bar 18 having respective like end sections 20 and 22 disposed on a lower plane than the center section 24 which is elevated by the bends or inclined surfaces 26. A hole 28 is formed in the center section 24 by which bar 18 is mounted to the motor shaft in any suitable manner. End sections 20 and 22 have relative to their direction of rotation the respective leading and trailing edges 30 and 32 which are preferably both provided with a like blade mounting 34 and thus like parts will be given like numerals. End sections 20 and 22 are preferably formed with a diagonal edge 36 extending from each leading edge of sections 20 and 22 rearwardly and outwardly toward and respective trailing edges thereof. Mounting 34 on each end 20 and 22 comprises a rigid fitting in the form of a plate having the integral portions 38 and 40 in stepped relationship. Portion 38 is secured to the top of the end section by any suitable means so that the outer edge 42 of portion 40 is parallel to edge 36. Portion 40 is also spaced above the top surface of end portions 20 and 22 to form a recess or socket 43 (Fig. 2) and one or more rivets 44 to serve as stops are vertically mounted in socket 43 between the respective end portions 20 and 22 and portion 40 of mounting 34.

Blade 46 is designed particularly as an expendable throw away item but is made of a suitable metal to provide a satisfactory cutting tool for a reasonably long period of time. It is generally rectangular in shape having a forward portion 48 which includes the cutting edge 50 and the rearward portion 52 in which there is formed one or more bayonet slots 54 to correspond preferably in number with the number of rivets 44 in socket 43. This blade is positioned in socket 43 by sliding portion 52 in socket 43 formed by mounting portion 40 and end portions 20 or 22 (Fig. 2) so that each slot 54 embraces one of the rivets 44 in such a way that the closed end of such slots is toward the center of bar 18. In this way such closed slot end will bear against the rivets under centrifugal force during rotation of member 18 and be adequately held in place. It has also been found by actual field tests that a small amount of cut grass will become wedged in mounting 34 so that blade 46 will not fall out even during non operation. The forward portion 48 of blade 46 may be bent downwardly as shown in Fig. 5 to place it below the end portion of member 18 if desired.

While I have preferably mounted blade 46 so that the cutting edge 50 is diagonal to the longitudinal axis of member 18 (Fig. 3) and thus affords a slicing action against the material being cut, this blade may be mounted as shown in Fig. 6 wherein the cutting edge 50 is parallel to the longitudinal axis of member 18 and is constructed and mounted in the same way as above described.

In Fig. 7 I have shown a modified form of my cutting blade assembly indicated generally by the numeral 56. The general shape of blade 56 is similar to that of blade assembly 46 (Fig. 4) and like parts will be given like numbers. The blade assembly 56 contains the forward and rear portions 48 and 52 with bayonet slots 54 as previously described and is provided with a lower plate section 58 mounted to the underside of portion 52 with corresponding slots 54. Plate 58 extends toward blade portion 48 in spaced relationship therewith so that portion 48 and the forward portion of plate 58 provide in effect bifurcated retaining arms or jaws 59 as seen in Fig. 7. Suitably clamped between such jaws is a blade 60 having the cutting edge 62. Preferably I have used ceramic material for blade 60 which can be fabricated with an extremely keen and relatively durable edge, although of the expendable and throw away type, and which is protected through the major portion of its area by the retaining arms 59 at front and rear as shown.

With reference to Figs. 8 and 9 I have shown a modified mounting 64 that can be used to receive my blades 46 and 56 in the same manner as described for mounting 34. Mounting 64 includes forming end portions 20 and 22 of member 18 so that a strap like integral member 66 can be bent under and back upon the main body in spaced relationship (Fig. 9) along the leading edge of such end portion, and carries the vertically disposed spaced rivets 68 similar to rivets 44. The resulting socket or holder is the same as that provided by mounting 34 with the exception that the space for receiving a blade is below the end portion 20 in mounting 64 and above it in mounting 34. Thus a blade placed in mounting 64 will have its cutting edge below the end portion of member 18 without being bent or inclined as shown in Fig. 5. The level of the cutting edge of the blade does not affect the principle of operation and is only relative to the height of the cut from the ground which can of course be regulated or adjusted by other means well known in the art.

It is submitted that the invention shown and described is aptly suited to achieve the purposes intended and is characterized by a combination of highly useful and mutually cooperating elements that combine their respective and proportionate functions in accomplishing the objects sought to be obtained.

It will be understood that the phraseology employed therein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:

1. A blade assembly for a rotary mower, comprising a blade holder designed for operable attachment to said mower for rotation about a central axis, a blade mounting member on one end of said blade holder, said blade mounting member including a plate having two integral surfaces in stepped relationship with the lowermost surface secured to said blade holder so that the uppermost surface is spaced from said blade holder to form a socket, a vertically disposed stop in said socket between said blade holder and the uppermost portion of said mounting member, a cutting blade provided with a slot, and said blade removably attached to said mounting member by the engagement of said slot with said stop.

2. A blade assembly for a rotary mower, comprising a blade holder designed for operable attachment to said mower for rotation about a central axis, a blade mounting member on one end of said blade holder, said blade mounting member including a plate having two integral surfaces in stepped relationship with the lowermost surface secured to said blade holder so that the uppermost surface is spaced from said blade holder to form a socket, a vertically disposed stop in said socket between said blade holder and the uppermost portion of said mounting member, a cutting blade provided with a bayonet slot, and said blade removably attached to said mounting member by the engagement of said slot with said stop in such a manner so as to bear against the same under centrifugal force during rotation of said blade holder and thus be held against displacement from said mounting member.

3. A blade assembly for a rotary mower, comprising an elongated blade holder designed for operable attachment to said mower for rotation about a central axis, a blade mounting member secured to one end of said blade holder, said blade mounting member including a portion disposed in spaced parallel relationship to said blade holder to form a socket, a stop member intersecting said socket, a cutting blade having a forward portion with a cutting edge and a rearward portion provided with a slot, and said blade mounted in said socket with said slot embracing said stop.

4. A device as defined in claim 3 wherein the closed end of said slot is disposed toward the axis of said blade holder whereby said blade bears against said stop under centrifugal force during rotation of said blade holder and is thus held against displacement from said socket.

5. A blade assembly for a rotary mower, comprising an elongated blade holder designed for operable attachment to said mower for rotation about a central axis, a blade mounting member secured to one end of said blade holder, said blade mounting member including a portion disposed in spaced parallel relationship to said blade holder, at least one vertically disposed member extending between said holder and said blade mounting member to form a stop, a cutting blade having a forward portion with a cutting edge and a rearward portion provided with a slot, and said blade mounted intermediate said holder and blade mounting member with said slot embracing said stop.

6. A blade assembly for a rotary mower, comprising an elongated blade holder designed for operable attachment to said mower for rotation about a central axis, a blade mounting member secured to one end of said blade holder, said blade mounting member including a portion disposed in spaced parallel relationship to said blade holder to form a socket, a stop member vertically intersecting said socket so as to extend between said holder and blade mounting member, a cutting blade having a forward portion with a cutting edge and a rearward portion provided with an elongated bayonet slot, and said blade mounted in said socket with said slot embracing said stop.

7. A blade assembly for a rotary mower, comprising a blade holder designed for operable attachment to said mower for rotation about a central axis, a blade mounting member, means securing said blade mounting member to one end of said holder so as to be in spaced parallel relationship thereto, a vertically disposed stop extending between said holder and said blade mounting member, a rectangular cutting blade having a forward and rear portion respectively, said forward portion having a cutting edge and said rearward portion provided with an elongated slot spaced from and parallel to the edge thereof and communicating at one end with the edge of said rearward portion, and said blade removably mounted intermediate said holder and said blade mounting member by the engagement of said slot with said stop.

8. A blade assembly for a rotary mower, comprising a blade holder designed for operable attachment to said mower for rotation about a central axis, a blade mounting member on one end of said blade holder, said blade mounting member including a plate having two integral surfaces in stepped relationship with the lowermost surface secured to said blade holder so that the uppermost surface is spaced from said blade holder to form a socket, a stop intersecting said socket, a cutting blade having a forward and rear portion respectively, said rearward portion provided with an elongated slot spaced from and parallel to the edge thereof and communicating at one end with the edge of said rearward portion, and said blade removably mounted in said socket by the engagement of said slot with said stop.

9. A blade assembly for a rotary mower, comprising an elongated blade holder designed for operable attachment to said mower for rotation about a central axis, an upstanding stop secured to one end of said blade holder, a plate secured along one edge to said holder so that its major area is in parallel spaced relationship to said holder extending over and secured to said stop, a cutting blade provided with a slot, and said blade mounted intermediate said holder and plate with said slot embracing said stop.

10. A blade assembly for a rotary mower, comprising an elongated blade holder designed for operable attachment to said mower for rotation about a central axis, said blade holder having leading and trailing edges respectively on each end, an upstanding stop secured to one end of said blade holder intermediate the leading and trailing edge thereof, a plate secured along one edge to said holder so that its major area is in parallel spaced relationship to said holder extending over and secured to said stop, a cutting blade having a forward and rear portion with said rear portion provided with a slot, and said blade mounted intermediate said holder and plate with said slot embracing said stop.

11. A blade assembly for a rotary mower, comprising an elongated blade holder designed for operable attachment to said mower for rotation about a central axis, said blade holder having leading and trailing edges respectively on each end, an upstanding stop secured to one end of said blade holder intermediate the leading and trailing edge thereof, a plate secured along one edge to said holder so that its major area is in parallel spaced relationship to said holder extending over and secured to said stop to form a socket open toward the leading edge of said blade holder, a cutting blade having a forward and rear portion with said rear portion provided with a slot, and said blade mounted intermediate said holder and plate with said slot embracing said stop.

12. A blade assembly for a rotary mower, comprising an elongated blade holder designed for operable attachment to said mower for rotation about a central axis, a blade mounting member, means securing said blade mounting member to one end of said holder so as to be in spaced parallel relationship thereto, a pair of vertically disposed stops extending between said holder and said blade mounting member, said stops in spaced relationship parallel to the longitudinal axis of said holder, and an elongated cutting blade having a pair of longitudinally spaced slots engageable with said respective stops.

References Cited in the file of this patent
UNITED STATES PATENTS

| | | |
|---|---|---|
| 737,543 | Wisner | Aug. 25, 1903 |
| 1,033,001 | Ganzhorn | July 16, 1912 |
| 2,232,261 | Orr | Feb. 18, 1941 |
| 2,477,442 | Cramer et al. | July 26, 1949 |
| 2,592,755 | Soenksen | Apr. 15, 1952 |
| 2,734,327 | Whitney | Feb. 14, 1956 |
| 2,850,862 | Asbury | Sept. 9, 1958 |